Oct. 30, 1951 T. BROWN 2,572,911
TRACTOR

Filed Sept. 13, 1947 3 Sheets-Sheet 1

INVENTOR
THEOPHILUS BROWN
BY
(ATTORNEYS)

Oct. 30, 1951 T. BROWN 2,572,911
TRACTOR
Filed Sept. 13, 1947 3 Sheets-Sheet 2

INVENTOR
THEOPHILUS BROWN
BY
ATTORNEYS

Oct. 30, 1951     T. BROWN     2,572,911
TRACTOR

Filed Sept. 13, 1947     3 Sheets-Sheet 3

INVENTOR
THEOPHILUS BROWN

Patented Oct. 30, 1951

2,572,911

UNITED STATES PATENT OFFICE 2,572,911

TRACTOR

Theophilus Brown, Moline, Ill., assignor to Deere & Company, Moline, Ill., a corporation of Illinois Application September 13, 1947, Serial No. 773,899

2 Claims. (Cl. 180—1)

The present invention relates generally to tractors and is more particularly concerned with farm tractors of the type adapted generally for tillage use, such as plowing, cultivating and the like.

The object and general nature of the present invention is the provision of a farm tractor so constructed and arranged that the operator has full vision, both in front of the tractor as well as in the rear thereof and so is particularly adapted for front mounted tools, such as cultivators as well as for trailing tools, such as plows and the like. More specifically, it is a feature of this invention to provide a farm tractor with a new and useful arrangement of the fuel tank and engine radiator with particular reference to tractors of the type wherein the operator is disposed above and in front of the tractor motor so as to have full forward vision, the radiator and fuel tank being especially constructed and arranged to permit, in addition to a full forward vision, a full rearward vision whereby the operator may easily and conveniently view the work of the rear tools during or immediately after their passage through the ground.

More particularly, it is a feature of this invention to provide a novel and useful arrangement of the fuel tank and radiator of a farm tractor wherein gear shift and power lift controls, such as those usually found on modern tractors, are readily accommodated without in any way affecting the full rearward vision which is afforded the operator.

These and other objects and advantages of the present invention will be apparent to those skilled in the art after a consideration of the following detailed description, taken in conjunction with the accompanying drawings, in which Figure 1 is a plan view of a farm tractor, with parts broken away, in which the principles of the present invention have been incorporated.

Figure 1:
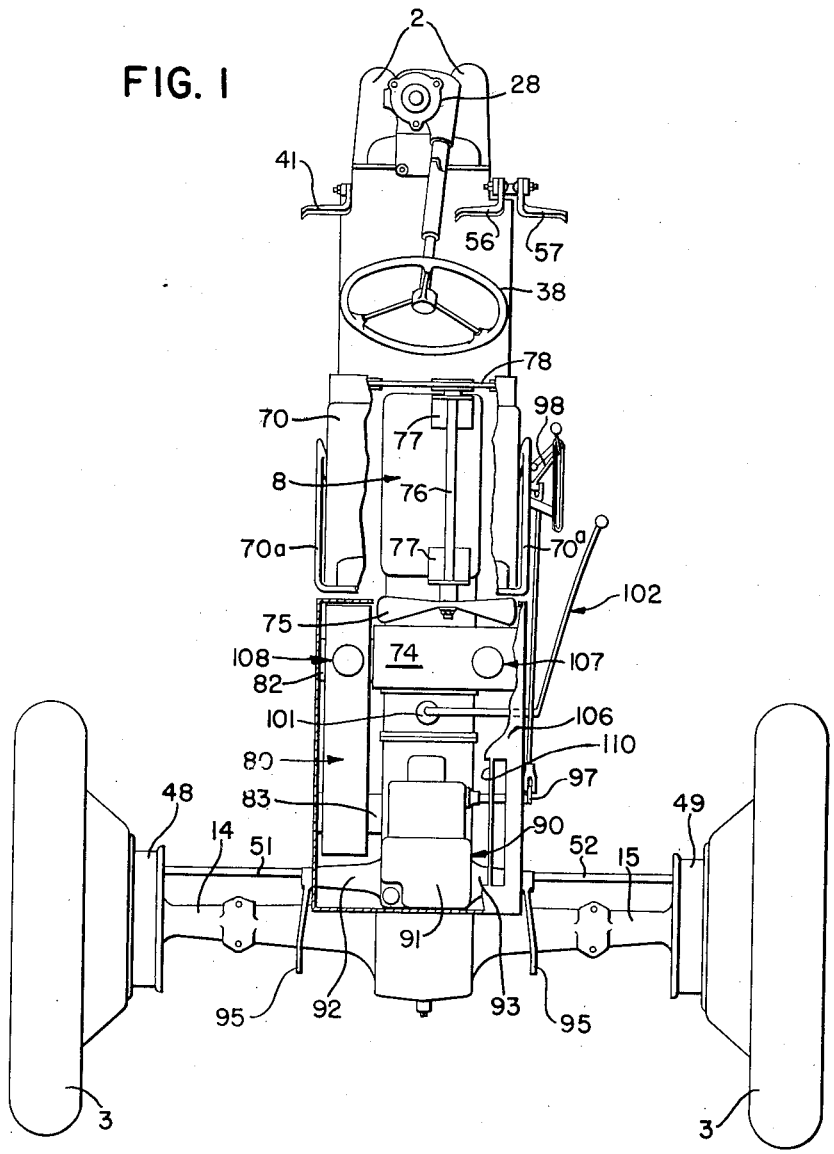

Referring now to the drawings, the tractor in which the principles of the present invention have been incorporated comprises a generally longitudinally extending frame, indicated in its entirety by the reference numeral 1 which is supported at its front end on a pair of closely spaced dirigible front wheels 2 and a pair of rear traction wheels 3. The frame 1 includes a pair of forwardly extending frame members 6 joined at their rear ends to a crank case 7 of a motor 8. Rearwardly of the motor and joined rigidly to the crank case 7 is a clutch housing 9, and connected rigidly to the rear portion of the latter is a transmission housing or gear case 11, which parts, being rigidly fastened together cooperate with the forward frame members 6 to form the frame of the tractor, as indicated by the reference numeral 1. Integral with the rear portion of the transmission case is a differential housing 12 to which the inner end portions of a pair of laterally extending rear axle housings 14 and 15 are fixed, as by bolts 17. Axle shafts 21 are journaled for rotation in the axle housings 14 and 15 and the wheels 3 fixed in any suitable way to the outer ends of the axle shafts 21, as in conventional tractors.

The front wheels 2 are mounted on a lower end portion 25 of a front wheel spindle 26 that is mounted for movement about a generally vertical axis in a vertically extending pedestal 27 to which the forward ends of the frame members 6 are suitably fixed. The upper end of the pedestal carries a housing or casing 28 enclosing a worm gear set including a worm gear 29 which is fixed to the upper end of the spindle 26 and a pinion which is connected with a short shaft 31 rotatably carried by the pedestal head casing 28. A bracket 33 is fixed to the pedestal and carries a supporting member 35 in which a steering wheel shaft 36 is supported for rotation, the shaft 36 being connected to the shaft 31 by a universal joint 37. Preferably, the upper portion of the bracket 33 is slotted, and the member 35 may be adjusted laterally on the upper portion of the bracket 33 so as to dispose a steering wheel 38, that is fixed to the outer end of the shaft 36, in different lateral positions as desired. An adjustable clutch pedal 41 is pivotally mounted, as at 42, on the left hand frame member 6 and is connected by links 43 and 44 to an arm 45 mounted on a shaft that extends laterally outwardly of the clutch housing 9, which shaft when rocked engages and disengages the tractor clutch. The tractor is also provided with brakes 48 and 49 that are operated by transverse brake shafts 51 and 52, and each of the latter carries an arm 53 that is connected by a forwardly extending link 54 and a forward link connection 55, with a pair of brake pedals 56 and 57 that are mounted at the right side of the tractor and arranged to be independently or simultaneously operated as desired. The front frame members 6 carry an operator's platform 60 upon which the operator may stand if desired. Rearwardly of the operator's platform 60 is a seat supporting member 65 in the form of a pair of brackets 66 that are bolted, as at 67 and 68, to the sides of the tractor frame, each bracket also including a rearwardly extending section 69, upon which sections the operator's seat 70 is mounted, being disposed in a position substantially directly above the tractor motor 8.

The seat 70 has opposite sides delineated by arm rests 70a which are spaced apart a distance greater than the width of the power plant.

As best shown in Figure 1, rearwardly of the tractor motor 8 and the operator's seat 70, is a radiator 74 which forms a part of the cooling system for the motor 8, the radiator 74 being disposed or laterally offset toward the right side of the tractor. The radiator 74 is disposed in a vertical transverse plane, having its opposite sides respectively substantially within the longitudinal upright planes of the sides of the seat as defined by the arm rests 70a, and immediately in front of the radiator is a fan 75 that is mounted on the rear end of a longitudinally extending shaft 76 supported by brackets 77 mounted on the motor or some other location in such a position that the shaft 76 is laterally offset, relative to the center line of the motor and the tractor, so as to dispose the fan 75 substantially directly in front of the radiator 74. The front end of the shaft 76 carries a pulley around which a driving belt 78 or some other driving means is disposed.

Figure 2:
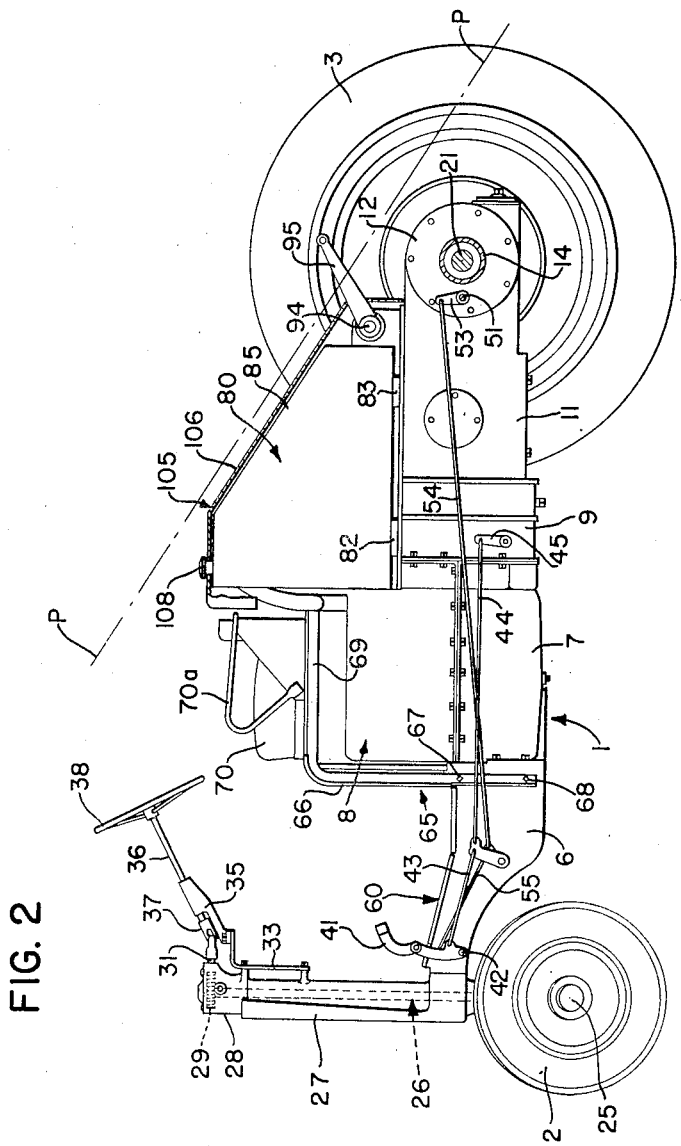
Figure 2 is a side view, partly in section, of the tractor shown in Figure 1.
Figure 3:
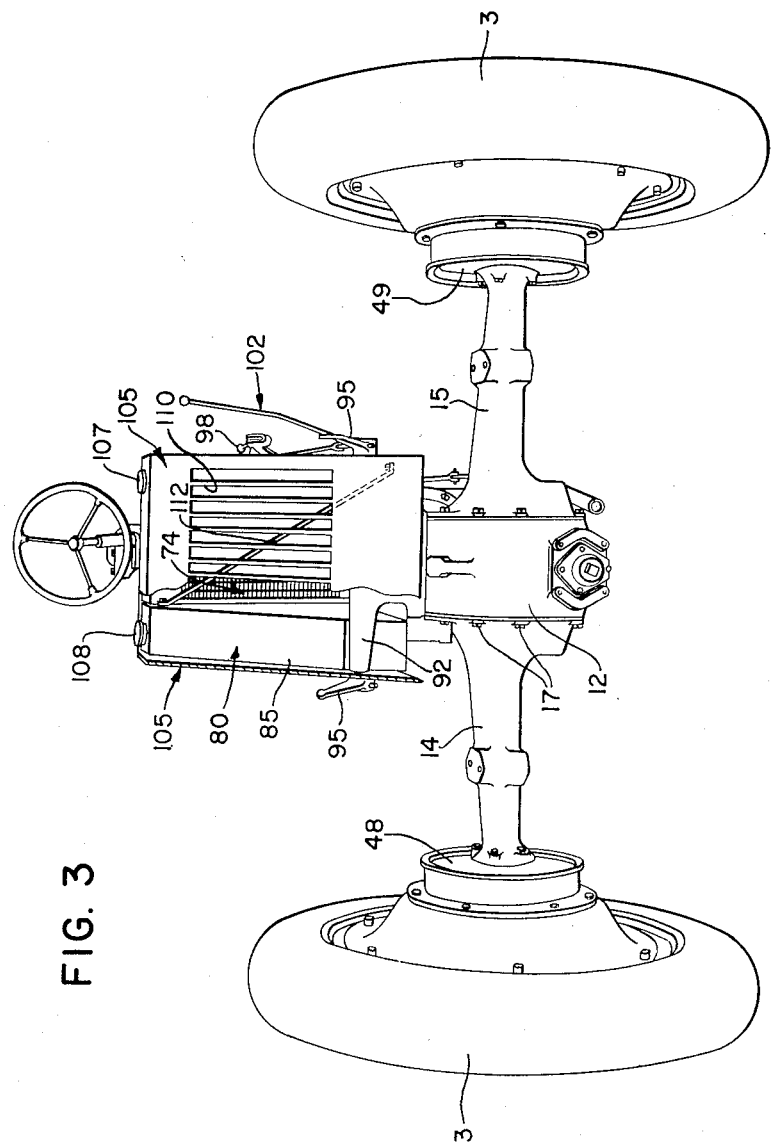
Figure 3 is a rear view, with portions broken away.

A fuel tank 80 is of generally triangular configuration, as viewed in Figure 2, and is a comparatively narrow container that is disposed generally in a vertical longitudinally extending plane, the forward end portion and the tallest part of the tank 80 being disposed forwardly in the space immediately at the left side of the radiator 74, the fuel tank 80 thus being disposed laterally offset toward the other side of the tractor frame and opposite the radiator 74, thus providing a comparatively compact arrangement. The radiator 74 and fuel tank 80 are supported on the tractor frame by any suitable means, such as a pair of transverse bars 82 and 83, supported on the clutch housing and gear case, respectively. According to the principles of the present invention the radiator 74 and the front portion of the fuel tank 80 extend upwardly to a point at or slightly above the back of the operator's seat 70, but the upper face 85 of the fuel tank 80 slopes downwardly and rearwardly toward the rear of the tractor generally alongside the clutch and transmission housings 9 and 11. Thus, an operator seated on the operator's seat 70, or standing on the platform 60, is enabled to look rearwardly and downwardly, generally along a transverse plane of vision that extends downwardly and rearwardly, passing just above the fuel tank 80 and rear axle of the tractor. Such a plane of vision is indicated in Figure 2 by the reference character P.

The right-hand outer wall of the radiator and the left-hand outer wall of the fuel tank are, it will be observed, respectively substantially coplanar with the sides of the seat 70 as represented by the parts 69, thus keeping the intermediate portion of the tractor desirably narrow.

The tractor described above also includes a power transmitting or power take-off unit indicated in its entirety by the reference numeral 90. This unit is here in the form of a power lift, which includes a power lift casing 91 having lateral extensions 92 and 93 in which a rockshaft 94 is mounted for rocking movement. The rockshaft 94 is actuated by hydraulic actuated mechanism which, so far as the present invention is concerned, is conventional. Implement raising and lowering arms 95 are fixed to the power lift rockshaft 94. As will be seen best in Figure 1, the fuel tank 80 terminates just forward of the adjacent power lift housing extension 92. The power lift unit 90 includes suitable valve mechanism controlled by a rockshaft 97 or equivalent means which is suitably connected to a controlling lever 98 mounted on the right side of the tractor adjacent the operator's seat 70 so as to be readily accessible for operation. The speed change mechanism in the gear box 11 is controlled by a gear shift lever 101 that extends generally upwardly behind the radiator 74 and to the right of the generally longitudinally extending fuel tank 80. The lever 101 is operated by suitable control means, indicated in its entirety by the reference numeral 102, such control means extending forwardly along the side of the tractor to a point accessible from the operator's platform 60 or seat 70. The radiator 74 and fuel tank 80 are enclosed by enclosure means in the form of a shell 105 which includes side wall portions and a downwardly and rearwardly sloping, combined top and rear wall portion or section 106 corresponding to the configuration of the fuel tank 80, the angular disposition of the wall 106 being such that the operator has a clear view of the tools at the rear of the tractor. The shell 105 includes suitable openings to receive the filler tube and cap, indicated at 107, for the radiator and a similar filler tube and cap 108 for the fuel tank, both being disposed rearwardly of the operator's seat 70 where, if necessary, the operator may visually inspect the liquid level in either of the containers 74 and 80. A grille 110 is accomplished by openings or perforations in the rearwardly and downwardly sloping wall 106 of the shell 105 and provides for the necessary movement of air through the rearwardly facing heat-exchange surface of the radiator 74. The fuel tank 80, being disposed in a generally longitudinally extending vertical plane, is braced by a downwardly and laterally extending reenforcing bar 112 which is connected at its upper end to the upper portion of the tank 80 and at its lower end to the right side of the tractor, such as to the right end of the supporting end 82. The fuel tank, so disposed, offers little or a minimum of interference with air currents passing to and from the radiator heat-exchange surface.

While I have shown and described above the preferred structure in which the principles of the present invention have been incorporated, it is to be understood that my invention is not to be limited to the particular details shown and described above, but that, in fact, widely diferent means may be employed in the practice of the broader aspects of my invention.

What I claim, therefore, and desire to secure by Letters Patent is:

1. A tractor comprising a longitudinal frame, a motor carried by the frame and disposed longitudinally thereof and including a transmission gear box rearwardly of the motor and a power take-off unit rearwardly of the gear box having laterally directed extensions extending toward opposite sides of the frame, an operator's platform carried by the frame at the front end thereof forwardly of the motor, an operator's seat over said motor, a radiator for the motor disposed rearwardly of the latter at one side of the frame, means mounting the radiator on the frame, a gear-shift-lever operating means extending from said gear box laterally toward said one side of the frame, around the radiator at said one side and forward to a point accessible to the operator on said seat or platform, a control means for the power take-off unit also extending laterally toward said one side of the frame, around the radiator at said one side and then forward to a point accessible to the operator on said seat or platform, a fuel tank disposed at the other side of said frame and disposed alongside the adjacent side of the radiator and extending rearwardly therefrom alongside said gear box and terminating just forwardly of the aforesaid extension of said power take-off unit that extends laterally at said side of said frame, and means mounting the fuel tank on the frame.

2. A tractor, comprising: a longitudinal body having front and rear ends and including midway between said ends and lengthwise thereof a power plant having front and rear end portions spaced respectively rearwardly and forwardly from the front and rear ends of the body; an operator's seat facing forwardly and carried by the body in a position over the power plant, said seat having opposite sides spaced apart transversely a distance greater than the width of the power plant, and further having a back ahead of the rear end portion of the power plant and extending to a height above the top of the power plant; a fuel tank, and a radiator, carried by the body and arranged to form an L as viewed from above, the radiator being positioned crosswise of the body immediately behind the back of the seat and having its top at the level of the top of the back of the seat and its opposite sides respectively substantially within the longitudinal upright planes of the sides of the seat, and the fuel tank extending lengthwise of one side of the body from the radiator to the rear of the body and having its outer wall within the plane of the side of the seat at that side of the body, said fuel tank having an upper forward portion adjacent the top of the radiator and a lower rearward portion at the rear end of the body, said fuel tank further having an upper wall that slopes downwardly and rearwardly and joins said front and rear portions; and enclosure means for the radiator and fuel tank, including longitudinal, upright side sheets respectively at opposite sides of the body and extending rearwardly from the radiator to the rear end of the fuel tank, said side sheets being respectively substantially coplanar with the sides of the seat and shaped to conform to the slope of the fuel tank, and a perforated upper member having opposite side portions connected respectively to the side sheets and following the slope thereof and also having front and rear portions respectively adjoining the top of the radiator and the rear of the body.

THEOPHILUS BROWN.

REFERENCES CITED

The following references are of record in the file of this patent:

UNITED STATES PATENTS

| Number | Name | Date |
|---|---|---|
| 1,390,757 | Burrows | Sept. 13, 1921 |
| 1,406,462 | Knowles | Feb. 14, 1922 |
| 1,433,257 | Brooks | Oct. 24, 1922 |
| 1,527,431 | Gumpper | Feb. 24, 1925 |
| 1,744,436 | Benjamin | Jan. 21, 1930 |
| 1,888,644 | Turzicky | Nov. 22, 1932 |
| 2,092,040 | Aitken | Sept. 7, 1937 |
| 2,237,677 | Lewis | Apr. 8, 1941 |
| 2,256,314 | Dunham | Sept. 16, 1941 |
| 2,336,410 | McKay | Dec. 7, 1943 |
| 2,378,615 | Brown | June 19, 1945 |